(12) United States Patent
Ishida et al.

(10) Patent No.: US 10,741,861 B2
(45) Date of Patent: Aug. 11, 2020

(54) POWER GENERATING CELL

(71) Applicant: HONDA MOTOR CO., LTD., Minato-ku, Tokyo (JP)

(72) Inventors: Kentaro Ishida, Wako (JP); Yu Tomana, Wako (JP); Akihito Giga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 16/229,001

(22) Filed: Dec. 21, 2018

(65) Prior Publication Data

US 2019/0198902 A1   Jun. 27, 2019

(30) Foreign Application Priority Data

Dec. 26, 2017  (JP) ................................ 2017-249331

(51) Int. Cl.
| | |
|---|---|
| *H01M 8/1004* | (2016.01) |
| *H01M 8/026* | (2016.01) |
| *H01M 8/04089* | (2016.01) |
| *H01M 8/0206* | (2016.01) |
| *H01M 8/0267* | (2016.01) |
| *H01M 8/1018* | (2016.01) |

(52) U.S. Cl.
CPC ......... *H01M 8/1004* (2013.01); *H01M 8/026* (2013.01); *H01M 8/0206* (2013.01); *H01M 8/0267* (2013.01); *H01M 8/04089* (2013.01); *H01M 2008/1095* (2013.01)

(58) Field of Classification Search
None
See application file for complete search history.

(56) References Cited

U.S. PATENT DOCUMENTS 9,178,224 B2 * 11/2015 Goebel ................. H01M 8/242

FOREIGN PATENT DOCUMENTS

| DE | 102014102895 | 9/2014 |
|---|---|---|
| JP | 2008-130433 | 6/2008 |
| JP | 2013-201086 | 10/2013 |
| JP | 2013-201091 | 10/2013 |
| JP | 2017-139318 | 8/2017 |
| WO | 2009/043600 | 4/2009 |
| WO | 2016/055510 | 4/2016 |

OTHER PUBLICATIONS

German Search Report for German Patent Application No. 102018222609.1 dated Jul. 18, 2019.
Japanese Office Action for Japanese Patent Application No. 2017-249331 dated Jun. 11, 2019.

* cited by examiner

*Primary Examiner* — Eli S Mekhlin (74) *Attorney, Agent, or Firm* — Amin, Turocy & Watson, LLP (57) ABSTRACT

A power generating cell is equipped with an MEA to which a resin frame is attached, and a first metal separator. In the first metal separator, there are provided an oxygen-containing gas flow field through which an oxygen-containing gas flows along an electrode surface, an outer peripheral bead surrounding the oxygen-containing gas flow field and which prevents leakage of a reaction gas, and a plurality of first bypass stopping convex portions that prevent bypassing of the reaction gas. Intermediate convex portions that support the resin film are provided between mutually adjacent ones of the first bypass stopping convex portions.

13 Claims, 7 Drawing Sheets

POWER GENERATING CELL

CROSS-REFERENCE TO RELATED APPLICATION

This application is based upon and claims the benefit of priority from Japanese Patent Application No. 2017-249331 filed on Dec. 26, 2017, the contents of which are incorporated herein by reference.

BACKGROUND OF THE INVENTION

Field of the Invention

The present invention relates to a power generating cell equipped with metal separators in which there are provided bead seals and bypass stopping convex portions.

Description of the Related Art

Generally, solid polymer electrolyte membranes which are made up from a polymer ion exchange membrane are adopted for use in a solid polymer electrolyte fuel cell. The fuel cell includes an electrolyte electrode assembly, for example, a membrane electrode assembly (MEA) in which an anode is disposed on one surface of the solid polymer electrolyte membrane, and a cathode is disposed on another surface of the solid polymer electrolyte membrane. The MEA is sandwiched between separators (bipolar plates) to thereby form a power generating cell (unit fuel cell). By stacking a predetermined number of such power generating cells, the power generating cells are used, for example, as a vehicle fuel cell stack.

In the power generating cell, cases exist in which metal separators are used as the separators. An anode side metal separator, in which a fuel gas flow field is formed for allowing a fuel gas to flow as one reaction gas along an anode, is disposed on one side surface of the MEA, and a cathode side separator, in which an oxygen-containing gas flow field is formed for allowing an oxygen-containing gas to flow as another reaction gas along a cathode, is disposed on another side surface of the MEA.

Incidentally, in Japanese Patent No. 5239091, in order to reduce manufacturing costs, in a metal separator, it has been disclosed to form a convex bead seal as a seal portion (a boundary wall 7) by press forming. Further, in Japanese Patent No. 5239091, in order to prevent the reaction gas from bypassing at an end portion of a reaction gas flow field provided in a flow field widthwise direction in the metal separator, a plurality of bypass stopping convex portions (restricting members 10) are provided between the bead seal and the reaction gas flow field.

On the other hand, in recent years, in order to reduce the amount that is used of a relatively expensive solid polymer electrolyte membrane, together with protecting the solid polymer electrolyte membrane which is in the form of a thin film having low strength, an MEA has been adopted that is equipped with a resin film in which a frame-shaped resin film is incorporated on an outer peripheral portion thereof (refer, for example, to Japanese Laid-Open Patent Publication No. 2008-130433).

SUMMARY OF THE INVENTION

The present invention has been devised in relation to the aforementioned conventional technology, and has the object of providing a power generating cell equipped with metal separators in which a plurality of bypass stopping convex portions are formed, and which is capable of stably supporting a resin film provided on the outer peripheral portion of a membrane electrode assembly.

In order to achieve the aforementioned object, a power generating cell is provided comprising a resin film equipped membrane electrode assembly, and metal separators disposed on both sides of the resin film equipped membrane electrode assembly, the resin film equipped membrane electrode assembly including a membrane electrode assembly formed with electrodes provided on both sides of an electrolyte membrane, and a resin film having a frame shape which is provided over an entire outer peripheral portion of the membrane electrode assembly, and reaction gas flow fields that allow reaction gases to flow along power generating surfaces being formed from one end to another end of the metal separators, and bead seals being provided that surround the reaction gas flow fields and configured to prevent leakage of the reaction gases, wherein the reaction gas flow fields include a plurality of flow field forming protrusions extending from the one end to the other end of the metal separators, and a plurality of flow field grooves formed between the plurality of flow field forming protrusions, and a plurality of bypass stopping convex portions configured to prevent bypassing of the reaction gases are provided at intervals in a direction of extension of the flow field forming protrusions, between portions of the bead seals that extend from the one end to the other end of the metal separators, and the flow field forming protrusions that are positioned at ends in a flow field widthwise direction of the reaction gas flow fields, wherein intermediate convex portions configured to support the resin film are provided in at least one of a pair of the metal separators, between mutually adjacent ones of the bypass stopping convex portions.

The intermediate convex portions preferably are provided respectively in one of the metal separators and another of the metal separators.

The intermediate convex portions provided on the one of the metal separators preferably face toward the intermediate convex portions provided on the other of the metal separators with the membrane electrode assembly intervening therebetween.

The intermediate convex portions preferably differ in shape from each other between the pair of metal separators.

The intermediate convex portions provided on the one of the metal separators, and the intermediate convex portions provided on the other of the metal separators preferably have shapes that extend along directions intersecting with each other.

The intermediate convex portions provided on the one of the metal separators preferably extend along the flow field widthwise direction, and the intermediate convex portions provided on the other of the metal separators preferably extend along the direction of extension of the flow field forming protrusions.

The bead seals preferably are of a wavy shape in a plan view as viewed from a thickness direction of the metal separators, side walls of the bead seals facing toward the flow field forming protrusions positioned at the ends preferably include concave side walls, which are curved so as to be recessed with respect to the flow field forming protrusions, and convex side walls, which are curved so as to bulge outwardly with respect to the flow field forming protrusions, the bypass stopping convex portions preferably are disposed at positions adjacent to the concave side walls, and the intermediate convex portions preferably are disposed at positions adjacent to the convex side walls.

The intermediate convex portions preferably are placed adjacent to the convex side walls via gaps.

A plurality of the intermediate convex portions preferably are disposed in parallel between mutually adjacent ones of the bypass stopping convex portions.

Effect of the Invention

According to the power generating cell of the present invention, the intermediate convex portions that support the resin film are provided between mutually adjacent ones of the bypass stopping convex portions. Therefore, the resin film can be supported not only by the plurality of bypass stopping convex portions, but also at locations between the bypass stopping convex portions. Accordingly, it is possible to support the resin film in a stable manner.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a power generating cell according to the present invention will be presented and described below with reference to the accompanying drawings.

Figure 1:
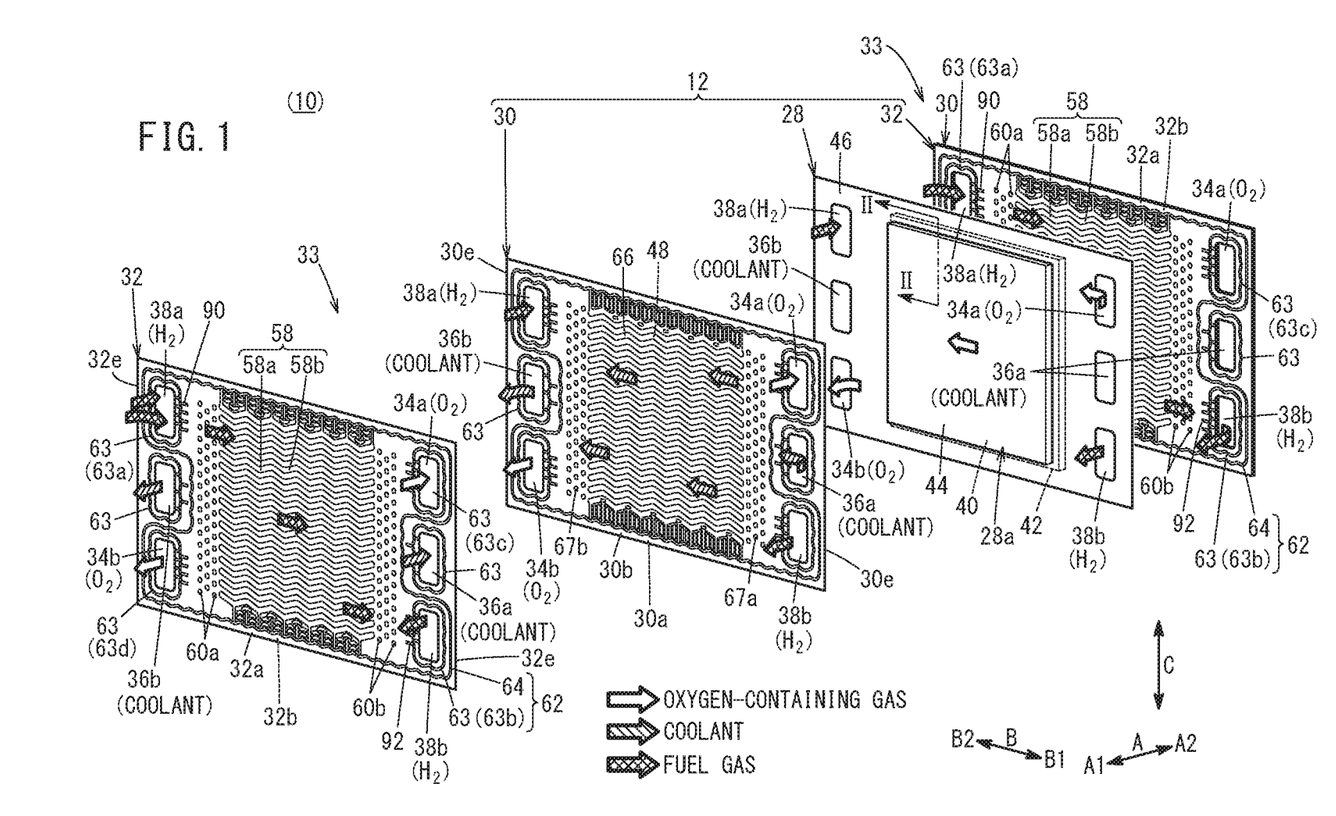
FIG. 1 is an exploded perspective view of a power generating cell according to an embodiment of the present invention.

A power generating cell 12 that makes up a unit fuel cell shown in FIG. 1 comprises a resin film equipped MEA 28, a first metal separator 30 disposed on one side surface (a side in the direction of the arrow A1) of the resin film equipped MEA 28, and a second metal separator 32 disposed on another side surface (a side in the direction of the arrow A2) of the resin film equipped MEA 28. A plurality of the power generating cells 12 are stacked, for example, in the direction of the arrow A (a horizontal direction), or in the direction of the arrow C (the direction of gravity), and a tightening load (compressive load) in the stacking direction is imparted to thereby make up the fuel cell stack 10. The fuel cell stack 10 is mounted, for example, as a vehicle incorporated fuel cell stack in a fuel cell electric vehicle (not shown).

The first metal separator 30 and the second metal separator 32 are constituted by press forming in a wavy shape a cross section of a steel plate, a stainless steel plate, an aluminum plate, a plated steel plate, or a metallic thin plate subjected to an anti-corrosive surface treatment on a metal surface thereof. In adjacent ones of the power generating cells 12, the first metal separator 30 of one power generating cell 12, and the second metal separator 32 of another power generating cell 12 are joined together integrally by welding, brazing, caulking or the like at the outer peripheral portion thereof to thereby constitute a joined separator 33.

At one end edge portion of the power generating cell 12 (an edge portion in the direction of the arrow B1) in the horizontal direction which is the longitudinal direction of the power generating cell 12, an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b are arranged in a vertical direction (in the direction of the arrow C). An oxygen-containing gas is supplied through the oxygen-containing gas supply passage 34a. A coolant, for example, water, is supplied through the coolant supply passage 36a. A fuel gas, for example, a hydrogen-containing gas, is discharged through the fuel gas discharge passage 38b.

At the other end edge portion of the power generating cell 12 (an edge portion in the direction of the arrow B2), a fuel gas supply passage 38a for supplying the fuel gas, a coolant discharge passage 36b for discharging the coolant, and an oxygen-containing gas discharge passage 34b for discharging the oxygen-containing gas are provided. The fuel gas supply passage 38a, the coolant discharge passage 36b, and the oxygen-containing gas discharge passage 34b are arranged sequentially in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The arrangement of the oxygen-containing gas supply passage 34a and the oxygen-containing gas discharge passage 34b, as well as the fuel gas supply passage 38a and the fuel gas discharge passage 38b is not limited to that shown for the present embodiment, and may be set appropriately depending on required specifications.

Figure 2:
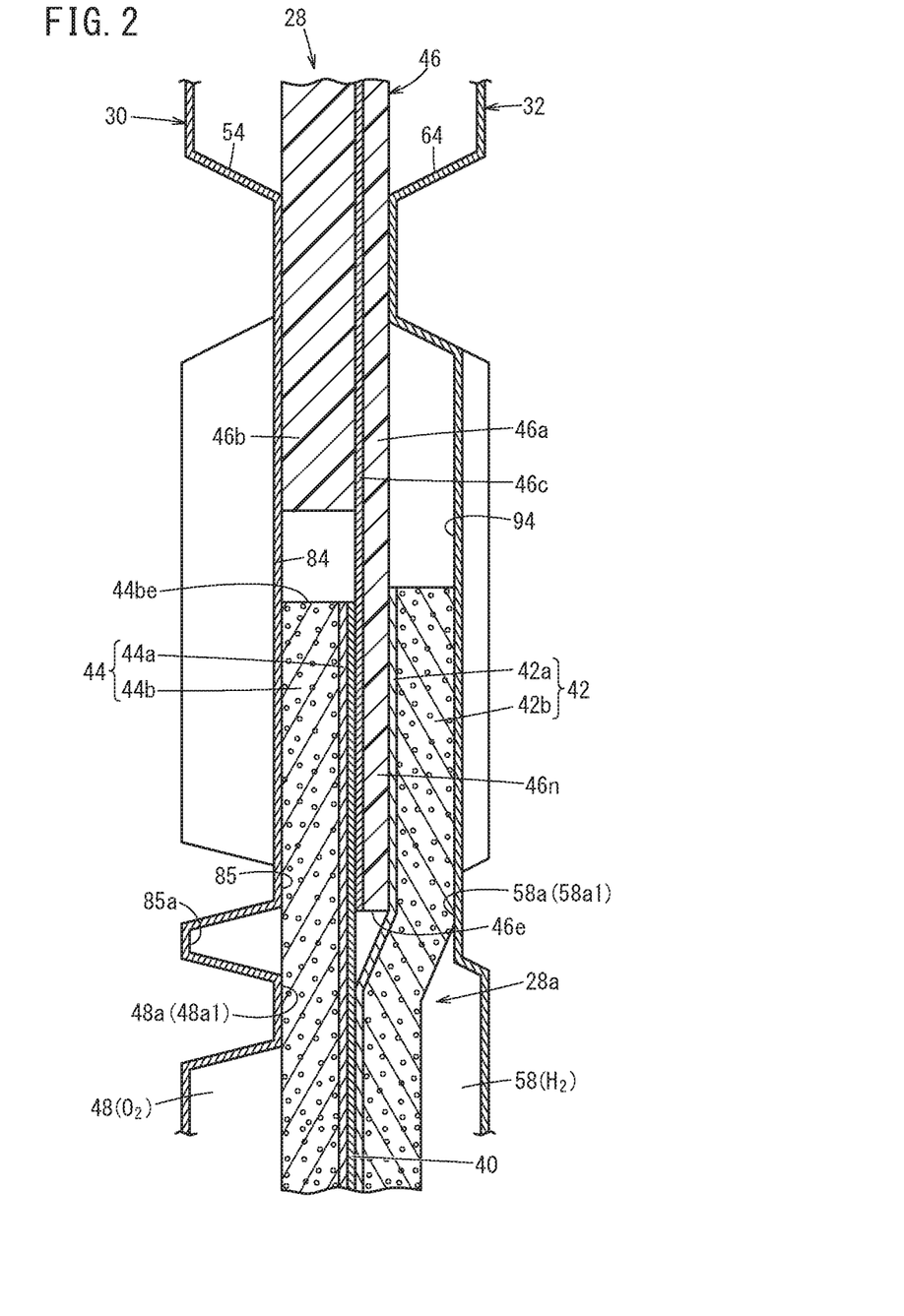
FIG. 2 is a cross-sectional view of the power generating cell taken along line II-II in FIGS. 1 and 4.

As shown in FIG. 2, the resin film equipped MEA 28 comprises a membrane electrode assembly 28a (hereinafter referred to as an "MEA 28a"), and a frame-shaped resin film 46 provided on the outer peripheral portion of the MEA 28a.

The MEA 28a includes an electrolyte membrane 40, and an anode 42 and a cathode 44 sandwiching the electrolyte membrane 40 therebetween. The electrolyte membrane 40 is a solid polymer electrolyte membrane (cation ion exchange membrane). The solid polymer electrolyte membrane is formed by impregnating a thin membrane of perfluorosulfonic acid with water, for example. The electrolyte membrane 40 is sandwiched and gripped between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a bonded to one surface of the electrolyte membrane 40, and a first gas diffusion layer 44b laminated on the first electrode catalyst layer 44a. The anode 42 includes a second electrode catalyst layer 42a bonded to another surface of the electrolyte membrane 40, and a second gas diffusion layer 42b laminated on the second electrode catalyst layer 42a.

The first electrode catalyst layer 44a and the second electrode catalyst layer 42a are formed on opposite surfaces of the electrolyte membrane 40. The first electrode catalyst layer 44a is formed, for example, by uniformly coating porous carbon particles with a platinum alloy supported on surfaces thereof, onto the surface of the first gas diffusion layer 44*b* together with an ionic conductive polymer binder. The second electrode catalyst layer 42*a* is formed, for example, by uniformly coating porous carbon particles with a platinum alloy supported on surfaces thereof, onto the surface of the second gas diffusion layer 42*b* together with an ionic conductive polymer binder. The first gas diffusion layer 44*b* and the second gas diffusion layer 42*b* are formed of carbon paper, carbon cloth, or the like.

As shown in FIG. 1, at an edge portion of the resin film 46 on a side in the direction of the arrow B1, an oxygen-containing gas supply passage 34*a*, a coolant supply passage 36*a*, and a fuel gas discharge passage 38*b* are provided. At an edge portion of the resin film 46 in the direction of the arrow B2, a fuel gas supply passage 38*a*, a coolant discharge passage 36*b*, and an oxygen-containing gas discharge passage 34*b* are provided.

As shown in FIG. 2, the resin film 46 includes two frame-shaped sheets 46*a*, 46*b* which differ in thickness. More specifically, the resin film 46 includes the first frame-shaped sheet 46*a*, an inner peripheral portion of which is joined to the outer peripheral portion of the MEA 28*a*, and a second frame-shaped sheet 46*b* that is joined to the first frame-shaped sheet 46*a*. The first frame-shaped sheet 46*a* and the second frame-shaped sheet 46*b* are joined to each other in a thickness direction by an adhesive layer 46*c* made up from an adhesive substance. The second frame-shaped sheet 46*b* is joined to an outer peripheral portion of the first frame-shaped sheet 46*a*.

The first frame-shaped sheet 46*a* and the second frame-shaped sheet 46*b* are made of a resin material. Examples of materials of the first frame-shaped sheet 46*a* and the second frame-shaped sheet 46*b*, include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

An inner peripheral portion 46*n* of the resin film 46 (inner peripheral portion of the first frame-shaped sheet 46*a*) is disposed between the outer peripheral portion of the anode 42 and the outer peripheral portion of the cathode 44. More specifically, the inner peripheral portion 46*n* of the resin film 46 is sandwiched between the outer peripheral portion of the electrolyte membrane 40 and the outer peripheral portion of the anode 42. The inner peripheral portion 46*n* of the resin film 46 and the outer peripheral portion of the electrolyte membrane 40 are joined via the adhesive layer 46*c*. The inner peripheral portion 46*n* of the resin film 46 may also be sandwiched between the electrolyte membrane 40 and the cathode 44.

The electrolyte membrane 40 may be formed to project outwardly without using the resin film 46. Further, a frame-shaped film may be disposed on both sides of the outwardly projecting electrolyte membrane 40.

Figure 3:
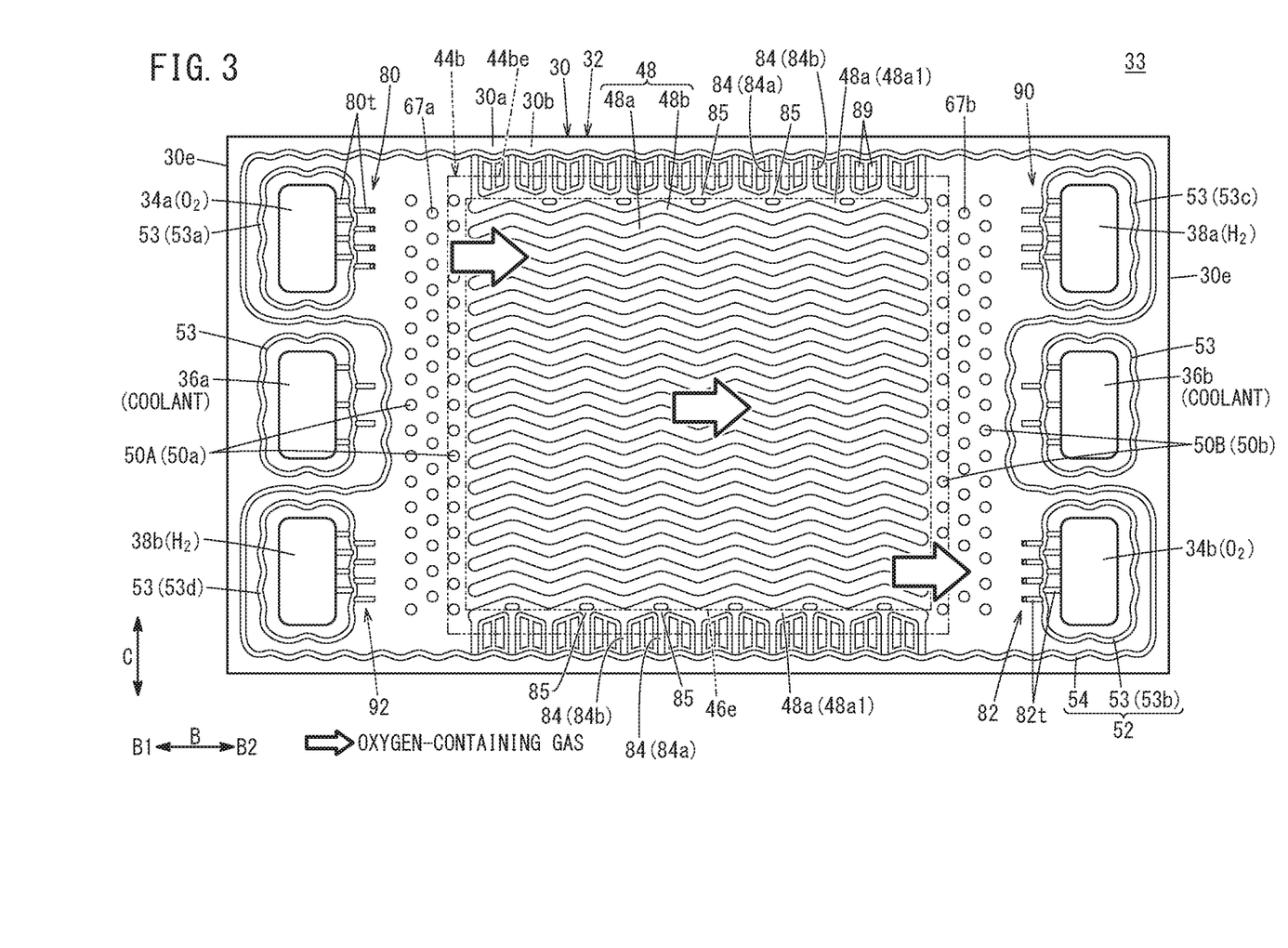
FIG. 3 is a plan view of the power generating cell as viewed from the side of a first metal separator.

As shown in FIG. 3, an oxygen-containing gas flow field 48 extending in the direction of the arrow B, for example, is disposed on a surface 30*a* (referred to hereinafter as a "front surface 30*a*") of the first metal separator 30 facing toward the resin film equipped MEA 28. The oxygen-containing gas flow field 48 communicates fluidically with the oxygen-containing gas supply passage 34*a* and the oxygen-containing gas discharge passage 34*b*. The oxygen-containing gas flow field 48 includes a plurality of flow field grooves 48*b* disposed between a plurality of flow field forming protrusions 48*a* that extend in the direction of the arrow B.

Accordingly, in the oxygen-containing gas flow field 48, a plurality of the flow field forming protrusions 48*a* and a plurality of the flow field grooves 48*b* are alternately arranged in the flow field widthwise direction (the direction of the arrow C). In the present embodiment, the planar shape (shape in a plan view) of the flow field forming protrusions 48*a* and the flow field grooves 48*b* is of a wavy shape. However, the present invention is not limited to this feature, and the planar shape of the flow field forming protrusions 48*a* and the flow field grooves 48*b* may be a straight shape (or may be made up of a combination of straight shapes).

Side walls on both sides in the widthwise direction (the direction of the arrow C) of the flow field forming protrusions 48*a* are inclined with respect to the thickness direction of the separators, and the cross-sectional shape of the flow field forming protrusions 48*a* is trapezoidal. The side walls on both sides in the widthwise direction of the flow field forming protrusions 48*a* may be parallel to the thickness direction of the separators, and the cross-sectional shape of the flow field forming protrusions 48*a* may be rectangular. Hereinafter, among the plurality of flow field forming protrusions 48*a*, those which are positioned at both ends in the flow field widthwise direction will be referred to as "end flow field forming protrusions 48*a*1". The end flow field forming protrusions 48*a*1 are disposed inside of an outer edge 44*be* of the first gas diffusion layer 44*b*.

On the front surface 30*a* of the first metal separator 30, an inlet buffer 50A having a plurality of boss arrays composed of a plurality of bosses 50*a* aligned in the direction of the arrow C is disposed between the oxygen-containing gas supply passage 34*a* and the oxygen-containing gas flow field 48. Further, on the front surface 30*a* of the first metal separator 30, an outlet buffer 50B having a plurality of boss arrays composed of a plurality of bosses 50*b* is disposed between the oxygen-containing gas discharge passage 34*b* and the oxygen-containing gas flow field 48.

Moreover, on a surface 30*b* of the first metal separator 30 on an opposite side from the oxygen-containing gas flow field 48, boss arrays composed of a plurality of bosses 67*a* aligned in the direction of the arrow C are provided between the above-described boss arrays of the inlet buffer 50A, and together therewith, boss arrays composed of a plurality of bosses 67*b* aligned in the direction of the arrow C are provided between the above-described boss arrays of the outlet buffer 50B (see FIG. 1). The bosses 67*a*, 67*b* which project at the side of the coolant surface constitute buffer sections on the side of the coolant surface.

First seal lines 52, which are formed by press forming, are formed to project or bulge out toward the resin film equipped MEA 28 (see FIG. 1) on the front surface 30*a* of the first metal separator 30. Although not shown in detail, on a projecting end surface of the first seal lines 52, a resin material may be fixed and attached thereto by printing or coating, etc. Such a resin material need not necessarily be used.

The first seal lines 52 include a plurality of bead seals 53 (hereinafter referred to as "passage beads 53") that individually surround the plurality of passages (the oxygen-containing gas supply passage 34*a*, etc.), and a bead seal 54 (hereinafter referred to as an "outer peripheral bead 54") that surrounds the oxygen-containing gas flow field 48, the inlet buffer 50A, and the outlet buffer 50B. The planar shapes of the passage beads 53 and the outer peripheral bead 54 are of a wavy shape when viewed from the thickness direction of the first metal separator 30. The planar shapes of the passage beads 53 and the outer peripheral bead 54 may also be of a straight shape.

The plurality of passage beads 53 project out toward the MEA 28 from the front surface 30a of the first metal separator 30, together with separately surrounding, respectively, the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. Hereinafter, among the plurality of passage beads 53, the one that surrounds the oxygen-containing gas supply passage 34a is referred to as a "passage bead 53a", and the one that surrounds the oxygen-containing gas discharge passage 34b is referred to as a "passage bead 53b".

On the first metal separator 30, bridge sections 80, 82 are provided, which enable communication between inner sides (on the side of the passages 34a, 34b) and outer sides (on the side of the oxygen-containing gas flow field 48) of the passage beads 53a, 53b. The bridge sections 80 are provided on a side portion of the passage bead 53a surrounding the oxygen-containing gas supply passage 34a on the side of the oxygen-containing gas flow field 48. The bridge sections 82 are provided on a side portion of the passage bead 53b surrounding the oxygen-containing gas discharge passage 34b on the side of the oxygen-containing gas flow field 48.

The bridge sections 80, 82 include a plurality of tunnels 80t, 82t provided respectively on the inside and the outside of the passage beads 53a, 53b. The tunnels 80t, 82t are formed by press forming to protrude from the front surface 30a of the first metal separator 30 and toward the resin film equipped MEA 28.

Between both end portions in the flow field widthwise direction (the end flow field forming protrusions 48a1) of the oxygen-containing gas flow field 48 and the outer peripheral bead 54, first bypass stopping convex portions 84 are provided for preventing bypassing of the oxygen-containing gas from the oxygen-containing gas supply passage 34a to the oxygen-containing gas discharge passage 34b. According to the present embodiment, the flow field widthwise direction of the oxygen-containing gas flow field 48 is a direction (in the direction of the arrow C) along the short side of the rectangular first metal separator 30. The first bypass stopping convex portions 84 are formed to protrude toward the resin film equipped MEA 28 (see FIG. 2). A plurality of the first bypass stopping convex portions 84 are arranged at intervals in the direction (the direction of the arrow B) in which the end flow field forming protrusions 48a1 extend.

Figure 4:
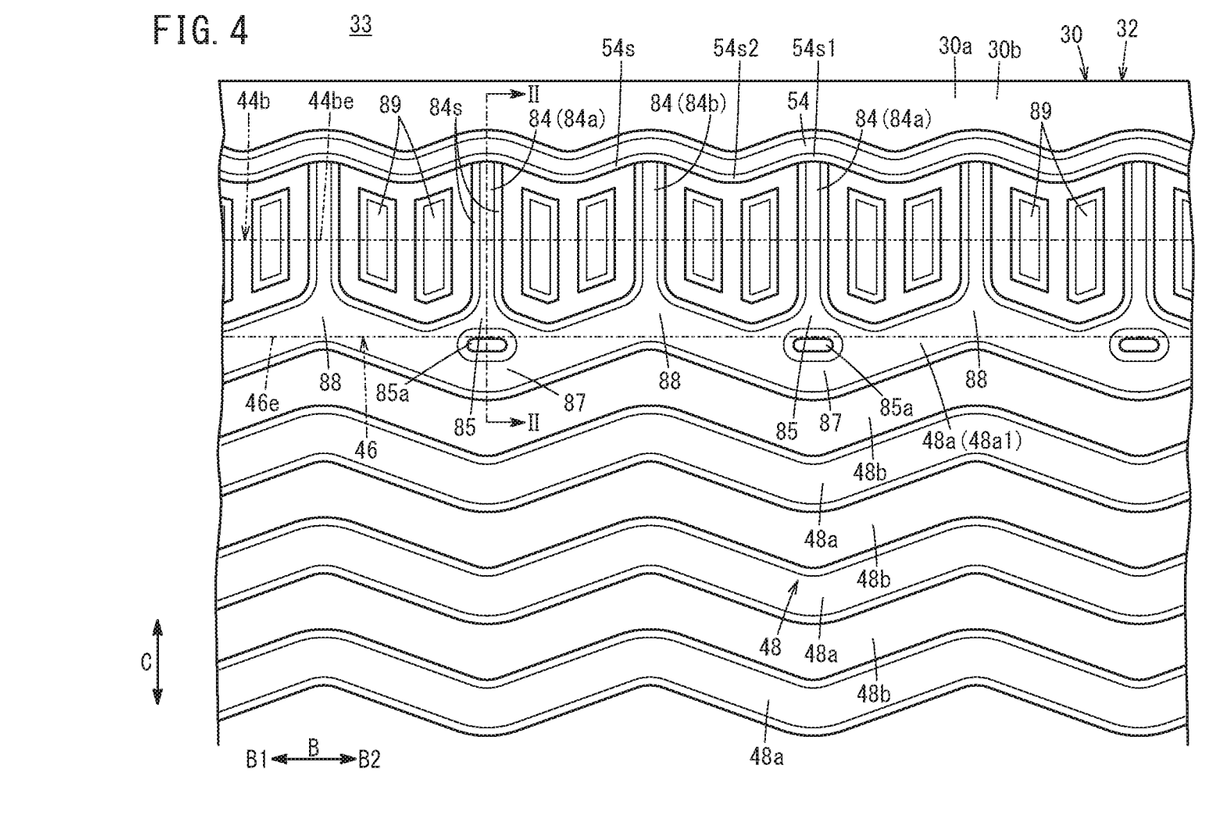
FIG. 4 is an enlarged plan view of principal parts of the first metal separator.

In FIG. 4, side walls 84s on both sides in the widthwise direction (the direction of the arrow B) of the first bypass stopping convex portions 84 are inclined with respect to the thickness direction of the separators, and the cross-sectional shape of the first bypass stopping convex portions 84 is trapezoidal. The side walls 84s on both sides in the widthwise direction of the first bypass stopping convex portions 84 may be parallel with respect to the thickness direction of the separators, and the cross-sectional shape of the first bypass stopping convex portions 84 may be rectangular.

The end flow field forming protrusions 48a1 have concave curved portions 87 which are curved so as to be recessed with respect to the outer peripheral bead 54, and convex curved portions 88 which are curved in an outwardly projecting manner with respect to the outer peripheral bead 54. The plurality of first bypass stopping convex portions 84 include first bypass stopping convex portions 84a provided between the concave curved portions 87 of the end flow field forming protrusions 48a1 and the outer peripheral bead 54, and first bypass stopping convex portions 84b provided between the convex curved portions 88 of the end flow field forming protrusions 48a1 and the outer peripheral bead 54. The ones of the first bypass stopping convex portions 84a and the others of the first bypass stopping convex portions 84b are arranged alternately at intervals mutually along the direction in which the end flow field forming protrusions 48a1 extend. In a state in which a tightening load has not been applied (in a state prior to stacking), the respective apex portions of the first bypass stopping convex portions 84a, 84b are lower than the apex portion of the outer peripheral bead 54. Accordingly, the first bypass stopping convex portions 84a, 84b are not positively subjected to a tightening load. In a state in which a tightening load has been applied (in a stacked state), the respective apex portions of the first bypass stopping convex portions 84a, 84b and the outer peripheral bead 54 are of the same height.

The plurality of bypass stopping convex portions 84 are connected to the outer peripheral bead 54 and to the end flow field forming protrusions 48a1. The ones of the first bypass stopping convex portions 84a are connected at one end thereof to the outer peripheral bead 54, and are connected at the other end thereof to the concave curved portions 87 of the end flow field forming protrusions 48a1. The others of the first bypass stopping convex portions 84b are connected at one end thereof to the outer peripheral bead 54, and are connected at the other end thereof to the convex curved portions 88 of the end flow field forming protrusions 48a1.

Intermediate convex portions 89 that support the outer peripheral portion (resin film 46) of the MEA 28a are provided between mutually adjacent ones of the first bypass stopping convex portions 84a, 84b.

Side walls 54s of the outer peripheral bead 54 facing toward the end flow field forming protrusions 48a1 have concave side walls 54s1 which are curved so as to be recessed with respect to the end flow field forming protrusions 48a1, and convex side walls 54s2 which are curved in an outwardly bulging manner with respect to the end flow field forming protrusions 48a1. The first bypass stopping convex portions 84 are provided at positions adjacent to the concave side walls 54s1. More specifically, the first bypass stopping convex portions 84 are connected to the concave side walls 54s1. The intermediate convex portions 89 are disposed at positions adjacent to the convex side walls 54s2. More specifically, the intermediate convex portions 89 are placed adjacent to the convex side walls 54s2 of the outer peripheral bead 54 via gaps.

The intermediate convex portions 89 protrude toward the resin film equipped MEA 28. The intermediate convex portions 89 have shapes extending in directions that intersect with the direction of the flow field (the direction of the arrow B). In particular, according to the present embodiment, the intermediate convex portions 89 have shapes extending in the flow field widthwise direction (the direction of the arrow C). In the present embodiment, the intermediate convex portions 89 are arranged in plurality individually between mutually adjacent ones of the first bypass stopping convex portions 84a, 84b. The plurality of intermediate convex portions 89 are different in length from each other. The plurality of intermediate convex portions 89 may also be formed with the same length as each other. The plurality of intermediate convex portions 89 are spaced apart from the plurality of bypass stopping convex portions 84, the outer peripheral bead 54, and the end flow field forming protrusions 48a1. The number of the intermediate convex portions 89 of the mutually adjacent first bypass stopping convex portions 84a, 84b is not limited in particular. In FIG. 4, between the mutually adjacent first bypass stopping convex portions 84a, 84b, intervals are arranged along the direction in which the end flow field forming protrusions 48a1 extend. The intermediate convex portions 89 are disposed at positions overlapping the outer edge 44be of the first gas diffusion layer 44b when viewed from the stacking direction. Respective apex portions of the first bypass stopping convex portions 84a, 84b and the intermediate convex portions 89 have the same height.

In the first metal separator 30, between the concave curved portions 87 of the end flow field forming protrusions 48a1 and the first bypass stopping convex portions 84a, first supporting convex portions 85 are provided for supporting the cathode 44 (first gas diffusion layer 44b). The first supporting convex portions 85 have concave portions 85a therein, which are recessed with respect to the cathode 44. As shown in FIG. 2, the first supporting convex portions 85 support the cathode 44 (the first gas diffusion layer 44b) at positions where the outer periphery of the MEA 28a and the inner periphery of the resin film 46 overlap in the thickness direction.

As shown in FIG. 1, a fuel gas flow field 58 extending in the direction of the arrow B, for example, is disposed on a surface 32a (referred to hereinafter as a "front surface 32a") of the second metal separator 32 facing toward the resin film equipped MEA 28.

Figure 5:
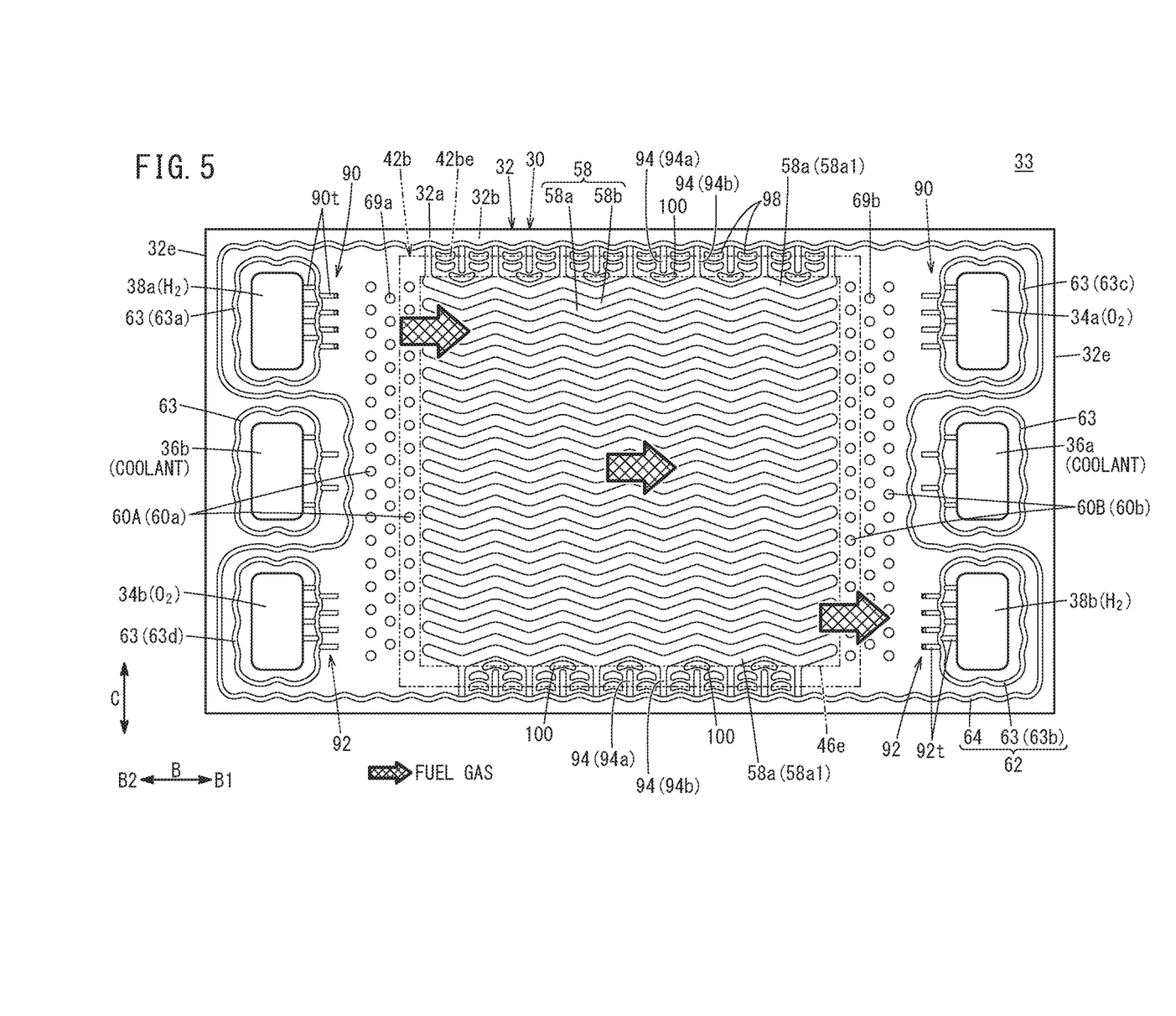
FIG. 5 is a plan view of the power generating cell as viewed from the side of a second metal separator.

As shown in FIG. 5, the fuel gas flow field 58 communicates fluidically with the fuel gas supply passage 38a and the fuel gas discharge passage 38b. The fuel gas flow field 58 includes a plurality of flow field grooves 58b disposed between a plurality of flow field forming protrusions 58a that extend in the direction of the arrow B. Accordingly, in the fuel gas flow field 58, a plurality of the flow field forming protrusions 58a and a plurality of the flow field grooves 58b are alternately arranged in the flow field widthwise direction (the direction of the arrow C). In the present embodiment, the planar shape of the flow field forming protrusions 58a and the flow field grooves 58b is of a wavy shape. However, the present invention is not limited to this feature, and the planar shape of the flow field forming protrusions 58a and the flow field grooves 58b may be a straight shape. Side walls on both sides in the widthwise direction (the direction of the arrow C) of the flow field forming protrusions 58a are inclined with respect to the thickness direction of the separators, and the cross-sectional shape of the flow field forming protrusions 58a is trapezoidal. The side walls on both sides in the widthwise direction of the flow field forming protrusions 58a may be parallel to the thickness direction of the separators, and the cross-sectional shape of the flow field forming protrusions 58a may be rectangular. Hereinafter, among the plurality of flow field forming protrusions 58a, those which are positioned at both ends in the flow field widthwise direction will be referred to as "end flow field forming protrusions 58a1". The end flow field forming protrusions 58a1 are disposed inside of an outer edge 42be of the second gas diffusion layer 42b.

On the front surface 32a of the second metal separator 32, an inlet buffer 60A having a plurality of boss arrays composed of a plurality of bosses 60a aligned in the direction of the arrow C is disposed between the fuel gas supply passage 38a and the fuel gas flow field 58. Further, on the front surface 32a of the second metal separator 32, an outlet buffer 60B having a plurality of boss arrays composed of a plurality of bosses 60b is disposed between the fuel gas discharge passage 38b and the fuel gas flow field 58.

Moreover, on a surface 32b of the second metal separator 32 on an opposite side from the fuel gas flow field 58, boss arrays composed of a plurality of bosses 69a aligned in the direction of the arrow C are provided between the above-described boss arrays of the inlet buffer 60A, and together therewith, boss arrays composed of a plurality of bosses 69b aligned in the direction of the arrow C are provided between the above-described boss arrays of the outlet buffer 60B. The bosses 69a, 69b which project at the side of the coolant surface constitute buffer sections on the side of the coolant surface.

Second seal lines 62, which are formed by press forming, are formed to project or bulge out toward the resin film equipped MEA 28 (see FIG. 1) on the front surface 32a of the second metal separator 32. Although not shown in detail, on a projecting end surface of the second seal lines 62, a resin material is fixed and attached thereto by printing or coating, etc. Such a resin material need not necessarily be used.

As shown in FIG. 5, the second seal lines 62 include a plurality of bead seals 63 (hereinafter referred to as "passage beads 63") that individually surround the plurality of passages (the fuel gas supply passage 38a, etc.), and a bead seal 64 (hereinafter referred to as an "outer peripheral bead 64") that surrounds the fuel gas flow field 58, the inlet buffer 60A, and the outlet buffer 60B. The planar shapes of the passage beads 63 and the outer peripheral bead 64 are of a wavy shape when viewed from the thickness direction of the second metal separator 32. The planar shapes of the passage beads 63 and the outer peripheral bead 64 may also be of a straight shape (or may be made up of a combination of straight shapes).

The plurality of passage beads 63 project out toward the MEA 28 from the front surface 32a of the second metal separator 32, together with separately surrounding, respectively, the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. Hereinafter, among the plurality of passage beads 63, the one that surrounds the fuel gas supply passage 38a is referred to as a "passage bead 63a", and the one that surrounds the fuel gas discharge passage 38b is referred to as a "passage bead 63b".

On the second metal separator 32, bridge sections 90, 92 are provided, which enable communication between inner sides (on the side of the passages 38a, 38b) and outer sides (on the side of the fuel gas flow field 58) of the passage beads 63a, 63b that surround the fuel gas supply passage 38a and the fuel gas discharge passage 38b, respectively. The bridge sections 90 are provided on a side portion of the passage bead 63a surrounding the fuel gas supply passage 38a on the side of the fuel gas flow field 58. The bridge sections 92 are provided at intervals on a side portion of the passage bead 63b surrounding the fuel gas discharge passage 38b on the side of the fuel gas flow field 58.

The bridge sections 90, 92 include a plurality of tunnels 90t, 92t provided respectively on the inside and the outside of the passage beads 63a, 63b. The tunnels 90t, 92t are formed by press forming to protrude from the front surface 32a of the second metal separator 32 and toward the resin film equipped MEA 28.

Between both end portions in the flow field widthwise direction (the end flow field forming protrusions 58a1) of the fuel gas flow field 58 and the outer peripheral bead 64, second bypass stopping convex portions 94 are provided for preventing bypassing of the fuel gas from the fuel gas supply passage 38a to the fuel gas discharge passage 38b. According to the present embodiment, the flow field widthwise direction of the fuel gas flow field 58 is a direction (in the direction of the arrow C) along the short side of the rectangular second metal separator 32. The second bypass stopping convex portions 94 are formed to protrude toward the resin film equipped MEA 28 (see FIG. 2). A plurality of the second bypass stopping convex portions 94 are arranged at intervals in the direction (the direction of the arrow B) in which the flow field grooves 58b extend.

Side walls on both sides in the widthwise direction (the direction of the arrow B) of the second bypass stopping convex portions 94 are inclined with respect to the thickness direction of the separators, and the cross-sectional shape of the second bypass stopping convex portions 94 is trapezoidal. The side walls on both sides in the widthwise direction of the second bypass stopping convex portions 94 may be parallel with respect to the thickness direction of the separators, and the cross-sectional shape of the second bypass stopping convex portions 94 may be rectangular.

Figure 6:
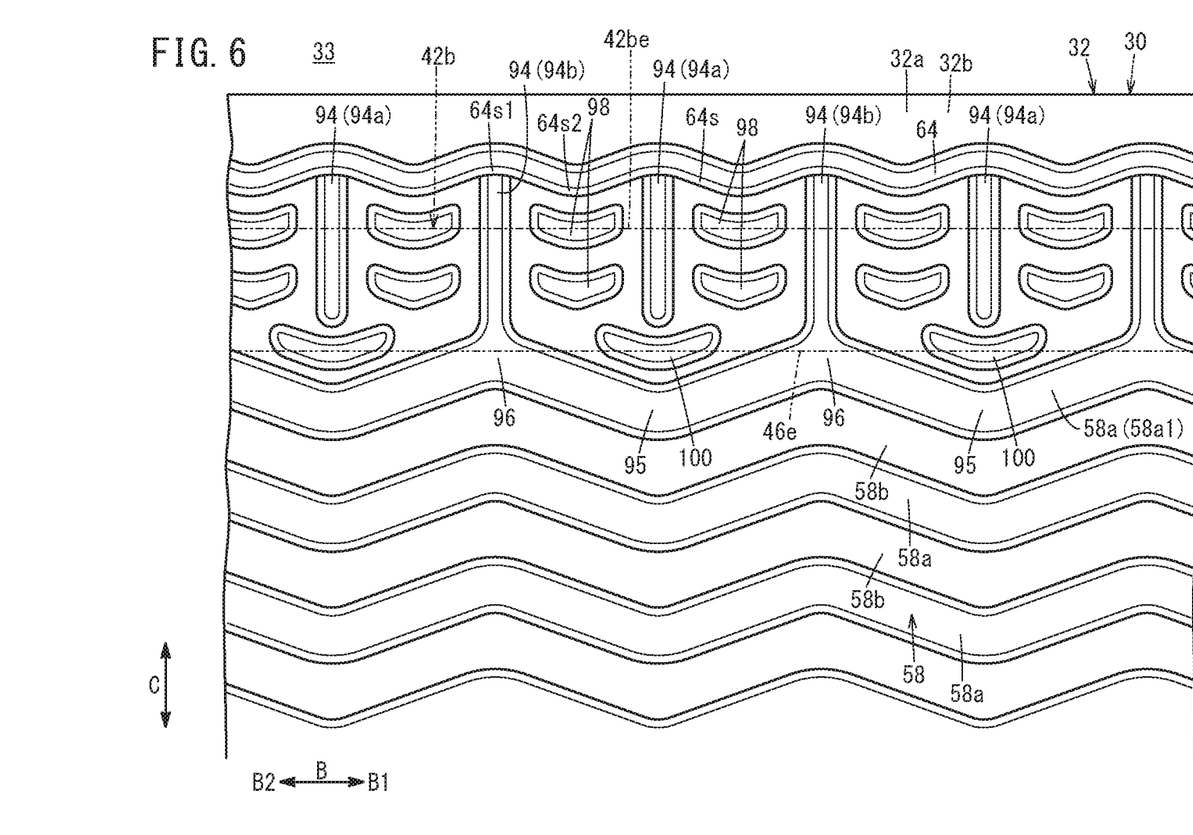
FIG. 6 is an enlarged plan view of principal parts of the second metal separator.

As shown in FIG. 6, the end flow field forming protrusions 58a1 have concave curved portions 95 which are curved so as to be recessed with respect to the outer peripheral bead 64, and convex curved portions 96 which are curved in an outwardly projecting manner with respect to the outer peripheral bead 64. The plurality of second bypass stopping convex portions 94 include second bypass stopping convex portions 94a provided between the concave curved portions 95 of the end flow field forming protrusions 58a1 and the outer peripheral bead 64, and second bypass stopping convex portions 94b provided between the convex curved portions 96 of the end flow field forming protrusions 58a1 and the outer peripheral bead 64. The ones of the second bypass stopping convex portions 94a and the others of the second bypass stopping convex portions 94b are arranged alternately at intervals mutually along the direction in which the end flow field forming protrusions 58a1 extend. In a state in which a tightening load has not been applied (in a state prior to stacking), the respective apex portions of the second bypass stopping convex portions 94 are lower than the apex portion of the outer peripheral bead 64. Accordingly, the second bypass stopping convex portions 94 are not positively subjected to a tightening load. In a state in which a tightening load has been applied (in a stacked state), the respective apex portions of the second bypass stopping convex portions 94 and the outer peripheral bead 64 are of the same height.

The ones of the second bypass stopping convex portions 94a are connected at one end thereof to the outer peripheral bead 64, and are connected at the other end thereof to the concave curved portions 95 of the end flow field forming protrusions 58a1. The others of the second bypass stopping convex portions 94b are connected at one end thereof to the outer peripheral bead 64, and are connected at the other end thereof to the convex curved portions 96 of the end flow field forming protrusions 58a1.

Intermediate convex portions 98 that support the outer peripheral portion (resin film 46) of the MEA 28a are provided between mutually adjacent ones of the second bypass stopping convex portions 94a, 94b. The intermediate convex portions 98 protrude toward the resin film equipped MEA 28. The intermediate convex portions 98 have a curved shape as viewed in the thickness direction of the second metal separator 32. The intermediate convex portions 98 are curved in convex shapes on the side of the fuel gas flow field 58.

Side walls 64s of the outer peripheral bead 64 facing toward the end flow field forming protrusions 58a1 have concave side walls 64s1 which are curved so as to be recessed with respect to the end flow field forming protrusions 58a1, and convex side walls 64s2 which are curved in an outwardly bulging manner with respect to the end flow field forming protrusions 58a1. The second bypass stopping convex portions 94 are provided at positions adjacent to the concave side walls 64s1. More specifically, the second bypass stopping convex portions 94 are connected to the concave side walls 64s1. The intermediate convex portions 98 are disposed at positions adjacent to the convex side walls 64s2. More specifically, the intermediate convex portions 98 are placed adjacent to the convex side walls 64s2 via gaps.

The intermediate convex portions 98 are disposed at positions overlapping the outer edge 42be of the second gas diffusion layer 42b when viewed from the stacking direction. The intermediate convex portions 98 have shapes extending in the direction of the flow field (the direction of the arrow B). The shapes of the intermediate convex portions 98 differ from the shapes of the intermediate convex portions 89 (see FIG. 4) provided on the first metal separator 30 when viewed from the stacking direction. The intermediate convex portions 98 provided on the second metal separator 32 face toward the intermediate convex portions 89 provided on the first metal separator 30 with the MEA 28a intervening therebetween (see FIG. 2).

The intermediate convex portions 98 are arranged in plurality individually between mutually adjacent ones of the second bypass stopping convex portions 94a, 94b. The plurality of intermediate convex portions 98 have the same length as each other. The number of the intermediate convex portions 98 of the mutually adjacent second bypass stopping convex portions 94a, 94b is not limited in particular. More specifically, in the present embodiment, between the mutually adjacent second bypass stopping convex portions 94a, 94b, the plurality of intermediate convex portions 98 are arranged with intervals being placed along the direction of separation (the direction of the arrow C) between the end flow field forming protrusions 58a1 and the outer peripheral bead 64. Respective apex portions of the second bypass stopping convex portions 94 and the intermediate convex portions 98 have the same height.

Figure 7:
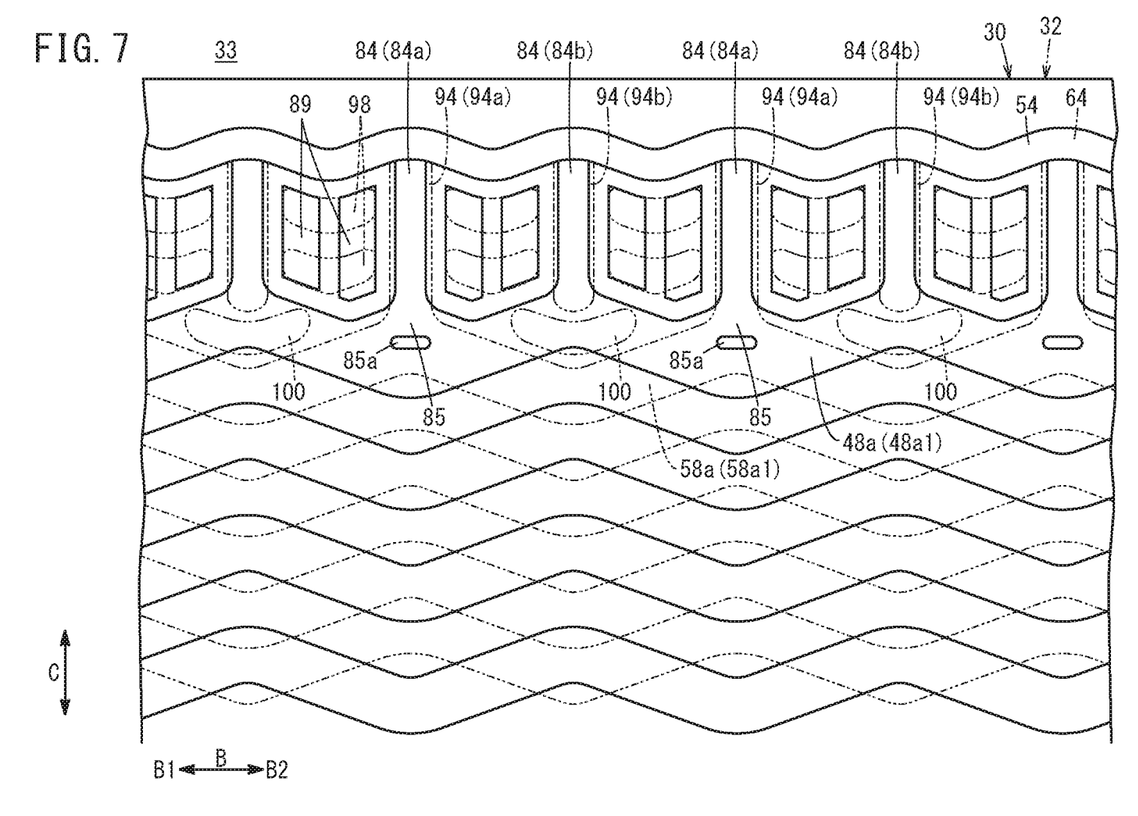
FIG. 7 is a view showing a state in which the second metal separator is stacked on the first metal separator.

As shown in FIG. 7, the arrangement direction of the plurality of intermediate convex portions 98 that are provided between the mutually adjacent second bypass stopping convex portions 94a, 94b differs from the arrangement direction of the plurality of intermediate convex portions 98 that are provided between the mutually adjacent first bypass stopping convex portions 84a, 84b. The intermediate convex portions 98 of the second metal separator 32 have shapes extending in a direction that intersects with the direction in which the intermediate convex portions 89 of the first metal separator 30 extend.

As shown in FIG. 6, in the second metal separator 32, between the concave curved portions 95 of the end flow field forming protrusions 58a1 and the second bypass stopping convex portions 94a, second supporting convex portions 100 are provided for supporting the anode 42 (second gas diffusion layer 42b). The second supporting convex portions 100 are formed by press forming to protrude toward the resin film equipped MEA 28. The second supporting convex portions 100 are of the same height as the intermediate convex portions 98.

As shown in FIG. 7, as viewed from the stacking direction, the flow field forming protrusions 48a of the oxygen-containing gas flow field 48 and the flow field forming protrusions 58a of the fuel gas flow field 58 have wavy shapes of the same wavelength and which are mutually opposite in phase. The first supporting convex portions 85 of the first metal separator 30 and the second supporting convex portions 100 of the second metal separator 32 are arranged alternately along the direction in which the flow field forming protrusions 48a, 58a extend.

As shown in FIG. 1, a coolant flow field 66 is formed between the surface 30b of the first metal separator 30 and the surface 32b of the second metal separator 32 that are joined together. The coolant flow field 66 is connected to and communicates fluidically with the coolant supply passage 36a and the coolant discharge passage 36b. The coolant flow field 66 is formed by stacking and matching together the back surface of the first metal separator 30 on which the oxygen-containing gas flow field 48 is formed, and the back surface of the second metal separator 32 on which the fuel gas flow field 58 is formed.

The power generating cell 12, which is configured as described above, operates in the following manner.

First, as shown in FIG. 1, an oxygen-containing gas, for example, air, is supplied to the oxygen-containing gas supply passage 34a. A fuel gas such as a hydrogen-containing gas or the like is supplied to the fuel gas supply passage 38a. Further, a coolant such as pure water, ethylene glycol, or oil is supplied to the coolant supply passage 36a.

The oxygen-containing gas flows from the oxygen-containing gas supply passage 34a into the oxygen-containing gas flow field 48 of the first metal separator 30. In addition, as shown in FIG. 3, the oxygen-containing gas moves along the oxygen-containing gas flow field 48 in the direction of the arrow B, and the oxygen-containing gas is supplied to the cathode 44 of the MEA 28a.

Meanwhile, as shown in FIG. 1, the fuel gas flows from the fuel gas supply passage 38a into the fuel gas flow field 58 of the second metal separator 32. As shown in FIG. 5, the fuel gas moves in the direction of the arrow B along the fuel gas flow field 58, and is supplied to the anode 42 of the MEA 28a.

Accordingly, in each of the MEAs 28a, the oxygen-containing gas, which is supplied to the cathode 44, and the fuel gas, which is supplied to the anode 42, are partially consumed in electrochemical reactions that take place in the first electrode catalyst layer 44a and the second electrode catalyst layer 42a, thereby generating electricity.

Next, as shown in FIG. 1, the oxygen-containing gas, which is supplied to and partially consumed at the cathode 44, flows from the oxygen-containing gas flow field 48 to the oxygen-containing gas discharge passage 34b, and the oxygen-containing gas is discharged in the direction of the arrow A toward the oxygen-containing gas discharge passage 34b. In the same way, the fuel gas, which is supplied to and partially consumed at the anode 42, flows from the fuel gas flow field 58 to the fuel gas discharge passage 38b, and the fuel gas is discharged in the direction of the arrow A toward the fuel gas discharge passage 38b.

Further, the coolant that is supplied to the coolant supply passage 36a flows into the coolant flow field 66 between the first metal separator 30 and the second metal separator 32, and thereafter, the coolant flows in the direction of the arrow B. After the coolant has cooled the MEA 28a, the coolant is discharged from the coolant discharge passage 36b.

In this case, the power generating cell 12 according to the present embodiment exhibits the following effects.

In the power generating cell 12, the intermediate convex portions 89 that support the resin film 46 are provided between mutually adjacent ones of the first bypass stopping convex portions 84 (see FIG. 4). Therefore, the resin film 46 can be supported not only by the plurality of first bypass stopping convex portions 84, but also at locations between the first bypass stopping convex portions 84. Further, the intermediate convex portions 98 that support the resin film

46 are provided between mutually adjacent ones of the second bypass stopping convex portions 94 (see FIG. 6). Therefore, the resin film 46 can be supported not only by the plurality of second bypass stopping convex portions 94, but also at locations between the second bypass stopping convex portions 94. Accordingly, it is possible to support the resin film 46 in a stable manner.

In the power generating cell 12, the intermediate convex portions 89, 98 are provided respectively on the first metal separator 30 and the second metal separator 32. In accordance with such a configuration, by the resin film 46 being supported from both sides by the intermediate convex portions 89, 98, the resin film 46 can be retained in a suitable fashion.

As shown in FIG. 2, the intermediate convex portions 89 provided on the first metal separator 30 face toward the intermediate convex portions 98 provided on the second metal separator 32 with the MEA 28a intervening therebetween. In accordance with such a configuration, since the resin film 46 is sandwiched between the intermediate convex portions 89, 98, it is possible to stably retain the resin film 46.

As shown in FIG. 7, the intermediate convex portions 89 provided on the first metal separator 30, and the intermediate convex portions 98 provided on the second metal separator 32 have shapes that extend along directions intersecting with each other. In accordance with such a configuration, even in the case that the mutual positioning of the pair of metal separators 30, 32 is shifted in the planar direction, it is possible to ensure a contact area and to stably retain the resin film 46.

The present invention is not limited to the embodiment described above, and various modifications can be adopted therein without departing from the essence and gist of the present invention.

What is claimed is:

1. A power generating cell comprising a resin film equipped membrane electrode assembly, and metal separators disposed on both sides of the resin film equipped membrane electrode assembly, the resin film equipped membrane electrode assembly including a membrane electrode assembly formed with electrodes provided on both sides of an electrolyte membrane, and a resin film having a frame shape which is provided over an entire outer peripheral portion of the membrane electrode assembly, and reaction gas flow fields formed on each of a pair of the metal separators that allow reaction gases to flow along power generating surfaces being formed from one end to another end of the metal separators, and bead seals being provided that surround the reaction gas flow fields and configured to prevent leakage of the reaction gases, wherein each of the reaction gas flow fields on the pair of the metal separators includes a plurality of flow field forming protrusions extending from the one end to the other end of the metal separators, and a plurality of flow field grooves formed between the plurality of flow field forming protrusions, and wherein a plurality of bypass stopping convex portions configured to prevent bypassing of the reaction gases are provided on each of the pair of metal separators, at intervals in a direction of extension of the flow field forming protrusions, between portions of the bead seals that extend from the one end to the other end of the metal separators, and the flow field forming protrusions that are positioned at ends in a flow field widthwise direction of the reaction gas flow fields;

wherein intermediate convex portions configured to support the resin film are provided between mutually adjacent ones of the bypass stopping convex portions; and the intermediate convex portions are provided respectively on one of the metal separators and another of the metal separators; and the intermediate convex portions provided on the one of the metal separators face toward the intermediate convex portions provided on the other of the metal separators with the membrane electrode assembly intervening therebetween.

2. The power generating cell according to claim 1, wherein the intermediate convex portions differ in shape from each other between the pair of metal separators.

3. The power generating cell according to claim 1, wherein the intermediate convex portions provided on the one of the metal separators, and the intermediate convex portions provided on the other of the metal separators have shapes that extend along directions intersecting with each other.

4. The power generating cell according to claim 1, wherein:
the intermediate convex portions provided on the one of the metal separators extend along the flow field widthwise direction; and
the intermediate convex portions provided on the other of the metal separators extend along the direction of extension of the flow field forming protrusions.

5. The power generating cell according to claim 1, wherein:
the bead seals are of a wavy shape in a plan view as viewed from a thickness direction of the power generation cell;
side walls of the bead seals facing toward the flow field forming protrusions positioned at the ends include concave side walls, which are curved so as to be recessed with respect to the flow field forming protrusions, and convex side walls, which are curved so as to bulge outwardly with respect to the flow field forming protrusions;
the bypass stopping convex portions are disposed at positions adjacent to the concave side walls; and
the intermediate convex portions are disposed at positions adjacent to the convex side walls.

6. The power generating cell according to claim 5, wherein the intermediate convex portions are placed adjacent to the convex side walls via gaps.

7. The power generating cell according to claim 1, wherein a plurality of the intermediate convex portions are disposed in parallel between mutually adjacent ones of the bypass stopping convex portions.

8. The power generating cell according to claim 7, wherein the plurality of intermediate convex portions differ in length from each other.

9. The power generating cell according to claim 7, wherein:
the plurality of bypass stopping convex portions are connected to the bead seal, and to the flow field forming protrusions positioned at the ends; and
the plurality of intermediate convex portions are disposed at a distance from the plurality of bypass stopping convex portions, the bead seal, and the flow field forming protrusions positioned at the ends.

10. The power generating cell according to claim 7, wherein the plurality of intermediate convex portions are mutually of same length.

11. The power generating cell according to claim 10, wherein:
each of the plurality of bypass stopping convex portions includes, respectively, one bypass stopping convex portion one end of which is connected to the bead seal, and another end of which is separated from the flow field forming protrusions positioned at the ends, and another bypass stopping convex portion one end of which is connected to the bead seal, and another end of which is connected to the flow field forming protrusions positioned at the ends; and
the one bypass stopping convex portion and the other bypass stopping convex portion are alternately arranged at intervals in the direction of extension of the flow field forming protrusions.

12. The power generating cell according to claim 1, wherein the intermediate convex portions have an arcuate curved shape when viewed from a thickness direction of the metal separators.

13. The power generating cell according to claim 12, wherein the intermediate convex portions are curved so as to have a convex shape on a side of the reaction gas flow field.

* * * * *

UNITED STATES PATENT AND TRADEMARK OFFICE
CERTIFICATE OF CORRECTION

PATENT NO. : 10,741,861 B2
APPLICATION NO. : 16/229001
DATED : August 11, 2020
INVENTOR(S) : Ishida et al.

Page 1 of 1

It is certified that error appears in the above-identified patent and that said Letters Patent is hereby corrected as shown below:

In the Claims

Column 15, Line 4, within Claim 1:
It should read:
wherein intermediate convex portions configured to support the resin film are provided between mutually adjacent ones of the bypass stopping convex portions;
the intermediate convex portions are provided respectively on one of the metal separators and another of the metal separators; and the intermediate convex portions provided on the one of the metal separators face toward the intermediate convex portions provided on the other of the metal separators with the membrane electrode assembly intervening therebetween.

Signed and Sealed this
Twenty-second Day of December, 2020

Andrei Iancu
*Director of the United States Patent and Trademark Office*